Aug. 1, 1933.  P. P. ALEXANDER  1,920,734
AUTOMATIC ARC WELDING APPARATUS
Original Filed Oct. 11, 1930
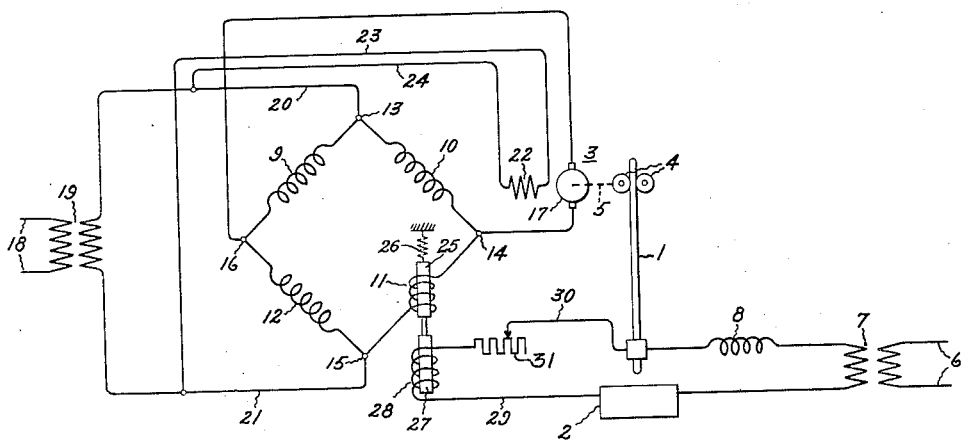
Inventor:
Peter P. Alexander,
by Charles E. Mullan
His Attorney.

Patented Aug. 1, 1933

1,920,734

UNITED STATES PATENT OFFICE 1,920,734

AUTOMATIC ARC WELDING APPARATUS

Peter P. Alexander, Marblehead, Mass., assignor to General Electric Company, a Corporation of New York Application October 11, 1930. Serial No. 488,080
Renewed October 26, 1932

5 Claims. (Cl. 219—8)

My invention relates to automatic arc welding and is particularly applicable to that form of welding in which the arc is drawn between an electrode and an article to be welded, although not limited thereto, since it may be used in any other form of welding for striking and maintaining the welding arc.

An object of my invention is to provide an improved arrangement which shall be both sensitive and positive in operation and applicable both to direct and alternating current arc welding systems, for controlling a reversible electrode feed motor in accordance with an electrical condition of the welding circuit.

A further object of my invention is to provide an improved system of control for the electrode feed motor whereby it may be reversed as to direction of rotation and run satisfactorily in both directions without the making or breaking of electrical contacts.

My invention will be better understood from the following description taken in connection with the accompanying drawing and its scope will be pointed out in the appended claims.

The single figure of the drawing diagrammatically illustrates one embodiment of my invention.

In the drawing the welding electrode is illustrated at 1 and the work to be welded at 2. The electrode 1 is fed toward and away from the work 2 constituting the other electrode by means of a feed motor 3. The feed motor may be connected directly or indirectly to the feeding mechanism, shown as rolls 4, by means indicated in the drawing by the dotted line 5. The electrode 1 and the work 2 are connected to a welding circuit which may be either direct current or alternating current. In the drawing the welding circuit has been illustrated as an alternating current circuit comprising a source of alternating current electromotive force 6, a transformer 7, and a reactance 8. The reactance 8 is employed to give the drooping characteristic desired for welding but may be omitted from the circuit provided the transformer 7 has a sufficiently high internal reactance.

The direction and speed of rotation of the feed motor 3 is controlled by a bridge circuit in which it is connected. In the particular arrangement illustrated coils 9, 10, 11 and 12 connected together at 13, 14, 15 and 16 and feed motor 3 are so related to one another as to constitute a Wheatstone bridge. The armature 17 of the feed motor 3 is connected across terminals 14 and 16 of this bridge and a source of electromotive force 18 is connected directly or indirectly through a transformer 19 and conductors 20 and 21 to the remaining terminals 13 and 15 of the bridge. The field 22 of the feed motor 3 is connected across the source of supply 18 through conductors 23, 24 and 20, 21 and transformer 19.

Means responsive to a characteristic of the welding circuit is employed according to my invention, for changing the relative impedance of the branches of the above-described bridge in order to control the direction and speed of rotation of the feed motor 3. In the particular arrangement illustrated in the drawing, the means comprises a core 25 which is moved into and out of coil 11 by electromagnetic means responsive to a characteristic of the welding circuit. The movement of the iron core in and out of the coil 11 varies the reactance of this coil and thereby disturbs the balance of the bridge and varies the amount and direction of current flowing in the armature circuit 17 of the feed motor 3. The core 25 is supported within the coil 11 by means of a spring 26 and is moved in and out of this coil by means of a core 27 attached thereto which extends within and is under the control of a coil 28 connected across the arcing electrodes 1 and 2 through conductors 29 and 30 and a rheostat 31. The energization of the coil 28 will vary depending upon the length of the arc between the electrodes 1 and 2 and the setting of the rheostat 31.

The system above described operates as follows:—With the electrode 1 out of engagement with the electrode 2 and both electrodes connected to a source of welding current, the full voltage of the source is applied to coil 28 which consequently will be fully energized. The core 27 will thus be drawn within the fully energized core 28 thereby moving core 25 into the coil 11 of the bridge circuit. The insertion of the core 25 in the coil 11 increases the impedance of this coil and thus the impedance of the branch of the bridge circuit including the coil. The change of impedance thus occasioned disturbs the balance of the bridge causing current to circulate in the armature of the motor 3 in such a direction as to feed the electrode 1 toward the work. This feeding action will continue until the electrode 1 engages the electrode 2 when the coil 28 will be short circuited and the cores 27 and 25 drawn wholly or partly out of their coils through the action of spring 26. When this takes place the impedance of coil 11 will be greatly decreased. This causes the bridge to be unbalanced in such a manner that current flows through the armature 17 of the feed motor in the opposite direction to its previous direction of flow and the motor 3 is caused to reverse its direction of rotation withdrawing the electrode 1 from the electrode 2 to strike the welding arc. As soon as an arc has been established between electrodes 1 and 2 the energization of the coil 28 is again established and varies in accordance with the length of the arc established between electrodes 1 and 2. The energization of coil 28 again attracts the core 27 within it and thereby moves core 25 into coil 11. When the arc potential has attained a predetermined value the amount of movement of the core 25 and the coil 11 is sufficient to again unbalance the bridge in a manner to reverse the direction of rotation of the feed motor 3 to feed the electrode 1 toward the work 2. Thereafter the rate of feed of the electrode 1 toward the electrode 2 is controlled by movement of the core 25 within coil 11 to unbalance the bridge sufficiently to cause the feed motor 3 to operate at a speed sufficient to maintain the desired welding arc characteristic. The desired length of welding arc may be controlled by adjusting the energization of the coil 28 through the rheostat 31 or by adjusting the tension of the spring 26, or both.

In the particular arrangement just considered the bridge has been described as an alternating current bridge, but it is apparent that a direct current bridge may be used without departing from the invention. When a direct current bridge is employed a variable resistance or rheostat will be used in place of the variable impedance 11 of the above bridge. The amount of resistance will be controlled by electromagnetic means such as illustrated in the drawing in order to control the balance of the bridge. It is thus apparent that the invention is applicable to direct current and alternating current systems and, as has been pointed out above, is applicable to forms of welding in which the arc is between the electrode and the work as illustrated as well as to other forms of welding in which the arc is struck between a plurality of electrodes.

The particular system illustrated and described has been shown diagrammatically in order to explain the invention. Switches in the various circuits have been omitted which in actual embodiments of the invention would be employed. For example, circuits would be used for making and breaking the welding and bridge exciting circuits and, under certain conditions, these switches would be interlocked so as to energize and de-energize these circuits simultaneously. Likewise without departing from my invention the bridge circuit may be unbalanced by varying the impedance of more than one branch of the bridge. These and other details may be incorporated in systems according to my invention without departing from the principles thereof. I therefore aim in the appended claims to cover such modifications and variations as fall within the true spirit and scope of my invention.

What I claim as new and desire to secure by Letters Patent of the United States, is,—

1. Automatic arc welding apparatus comprising electrode feeding mechanism, a motor for operating said feeding mechanism, a balanced circuit, means for connecting said motor in said circuit, means for controlling said circuit, and means responsive to a characteristic of the welding arc for operating said last-mentioned means.

2. Automatic arc welding apparatus comprising electrode feeding mechanism, a motor for operating said feeding mechanism, a plurality of parallel circuits, a source of electromotive force, means for connecting said parallel circuits, said source of electromotive force and said motor in the form of a Wheatstone bridge with said motor connected across said bridge, means for changing the relative impedance of the branches of said bridge to control the operation of said motor, and means responsive to a characteristic of the welding arc for operating said last-mentioned means.

3. Automatic arc welding apparatus comprising electrode feeding mechanism, a motor for operating said feeding mechanism, a plurality of parallel circuits, a source of electromotive force, means for connecting said parallel circuits, said source of electromotive force and said motor in the form of a Wheatstone bridge with said motor connected across said bridge, and electromagnetic means responsive to a departure from a predetermined desired welding arc characteristic for unbalancing said bridge and thereby operating said motor to reestablish said desired arcing characteristic.

4. Welding apparatus comprising cooperating welding electrodes, a welding circuit, means for connecting said electrodes in said circuit, a source of electromotive force, two parallel circuits independent of said welding circuit and connected across said source of electromotive force, a reversible feed motor having field and armature circuits, means operated by said feed motor for moving said electrodes relatively to one another to strike and maintain a welding arc established therebetween, means for connecting one of said motor circuits, across said source of electromotive force, means for connecting the other of said motor circuits across normally equal potential points in said parallel circuits, and means responsive to a departure from a predetermined characteristic of the welding arc established between said electrodes for varying the relative potential of said points of connection in said parallel circuits and for operating said motor to move said electrodes relatively to one another to restore said predetermined arc characteristic.

5. Automatic arc welding apparatus comprising electrode feeding mechanism, an alternating current motor for operating said feeding mechanism, a source of alternating current electromotive force, a plurality of parallel circuits, a coil in one of said circuits, means for connecting said parallel circuits, said motor and said source of electromotive force in the form of a Wheatstone bridge with said motor connected across said bridge and said coil connected in one branch thereof, a movable iron core in said coil, and means responsive to a departure from a predetermined welding arc characteristic for moving said core in and out of said coil and for controlling the balance of said bridge and the operation of said motor to reestablish said desired arcing characteristic.

PETER P. ALEXANDER.